United States Patent
Griffin et al.

(10) Patent No.: US 8,626,065 B2
(45) Date of Patent: Jan. 7, 2014

(54) NEAR-FIELD COMMUNICATION (NFC) SYSTEM PROVIDING PLUG-IN DEVICE CONNECTION ASSISTANCE FEATURES AND RELATED METHODS

(75) Inventors: Jason Tyler Griffin, Kitchener (CA); David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 554 days.

(21) Appl. No.: 12/855,994

(22) Filed: Aug. 13, 2010

(65) Prior Publication Data

US 2012/0040609 A1 Feb. 16, 2012

(51) Int. Cl.
H04B 7/00 (2006.01)

(52) U.S. Cl.
USPC ........................................ 455/41.2; 455/41.1

(58) Field of Classification Search
USPC ............ 455/41.1–41.3, 558, 411, 556.1, 418; 340/854.8, 517, 539.24, 555, 539.22, 340/572.1, 870.16, 541, 545.1, 5.71, 506, 340/573.1, 573.3, 604, 628, 686.1, 815.4, 340/815.45, 815.53, 907
See application file for complete search history.

(56) References Cited

U.S. PATENT DOCUMENTS

| | | | | |
|---|---|---|---|---|
| 6,109,760 | A | 8/2000 | Salatrik et al. | 362/95 |
| 6,330,307 | B1 * | 12/2001 | Bloch et al. | 379/25 |
| 7,004,595 | B1 | 2/2006 | Stoddard | 362/95 |
| 7,193,620 | B2 | 3/2007 | Nguyen et al. | 345/204 |
| 7,506,219 | B2 * | 3/2009 | Bhesania et al. | 714/57 |
| 2005/0225983 | A1 * | 10/2005 | Fornell | 362/276 |
| 2006/0044148 | A1 | 3/2006 | Daniels et al. | |
| 2008/0157978 | A1 * | 7/2008 | Kotzin et al. | 340/572.8 |
| 2008/0233780 | A1 | 9/2008 | Waters et al. | 439/214 |
| 2010/0014007 | A1 * | 1/2010 | Kotani | 348/744 |

FOREIGN PATENT DOCUMENTS

| | | | |
|---|---|---|---|
| JP | 2004357193 | 12/2004 | |
| JP | 2006246024 | 9/2006 | |
| JP | 2007171871 | 7/2007 | |
| JP | 2008192626 | 4/2008 | |
| KR | 1020070016202 | 2/2007 | |
| WO | 2008/011553 | 1/2008 | A61B 19/00 |

OTHER PUBLICATIONS

USB Data Cable with LED Light http://www.alibaba.com/product-gs/275414590/usb_data_cable_with_let_light.html.

(Continued)

*Primary Examiner* — Edward Urban
*Assistant Examiner* — Golam Sorowar
(74) *Attorney, Agent, or Firm* — Allen, Dyer, Doppelt, Milbrath & Gilchrist, P.A.

(57) ABSTRACT

A near-field communication (NFC) system may include a plug-in device(s) including a first NFC sensor, and a mobile wireless communications device. The mobile wireless communications device may include a portable housing defining a plug-in device port(s), a light source(s) carried by the portable housing and positioned to illuminate the plug-in device port(s), an optical sensor carried by the portable housing configured to determine an ambient light level, and a second NFC sensor carried by the portable housing and configured to establish NFC communications with the first NFC sensor when in close proximity therewith. A controller may be carried by the portable housing and coupled to the light source(s), the optical sensor, and the second NFC sensor and configured to cause the light source(s) to illuminate the plug-in device port(s) based upon NFC communications between the first and second NFC sensors and the ambient light level.

21 Claims, 7 Drawing Sheets

(56) References Cited

OTHER PUBLICATIONS

Illuminated USB Cable: http://www.soundtech.com/products/illuminated-usb-cable/stusbmini6/.

Rca Dt6hpl Digital Optical Audio Cables With Lighted Halo Connector (6 Ft): http://www.kaboodle.com/reviews/rca-dt6hpl-digital-opticalaudio-cables-with-lighted-halo-connector-6-ft).

Neon USB Cables Light up the Night, http://www.everythingusb.com/ion-desk-fx-illuminated-usbcable-18343.html, Jan. 13, 2010.

Lighted Connectors show that circuits are energized. http://news.thomasnet.com/fullstory/450265, Mar. 31, 2004.

"Toward a NFC Phone-Driven Context Awareness Smart Environment" http://www.computer.org/portal/web/csdl/doi/10.1109/UICATC_2009.37, Jul. 7, 2009.

DIN 43650 Solenoid Valve Connectors: http://www.majordin43650.com/htp/htpb2.html Copyright 2008.

MagSafe: http://en.wikipedia.org/wiki/MagSafe, last modified Nov. 6, 2010.

* cited by examiner

NEAR-FIELD COMMUNICATION (NFC) SYSTEM PROVIDING PLUG-IN DEVICE CONNECTION ASSISTANCE FEATURES AND RELATED METHODS

TECHNICAL FIELD

The present disclosure relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

With NFC technology becoming more widely adopted, it is now used with portable wireless communications devices in association with other short-range wireless communications, such as a wireless Bluetooth connection. For example, an NFC connection is often used to establish a wireless Bluetooth connection in which data for establishing the Bluetooth connection is communicated.

DETAILED DESCRIPTION

Figure 1:
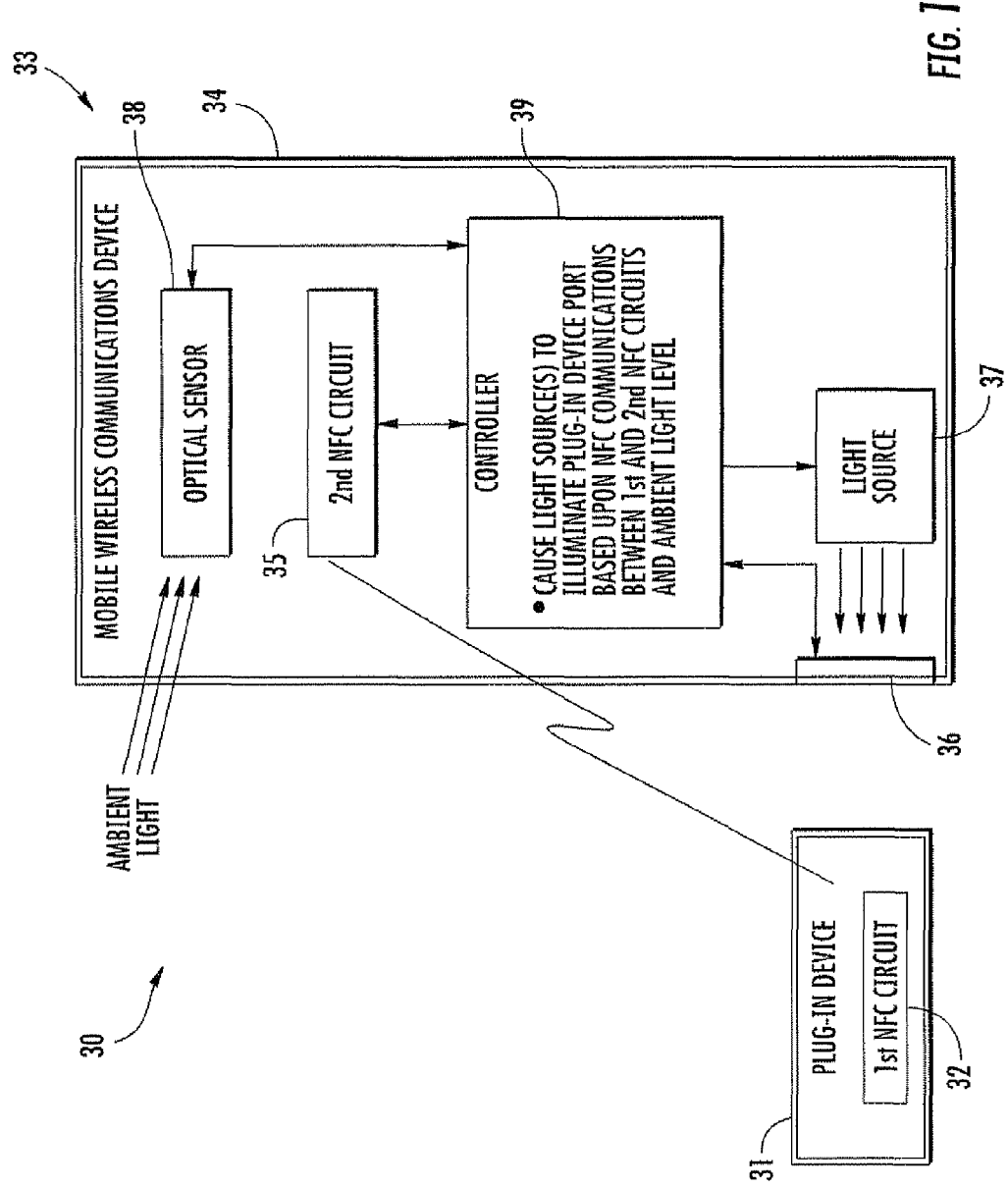
FIG. 1 is a schematic block diagram of a near-field communication (NFC) system in accordance with an example embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a near-field communication (NFC) system is disclosed herein which may include at least one plug-in device comprising a first NFC sensor, and a mobile wireless communications device. More particularly, the mobile wireless communications device may include a portable housing defining at least one plug-in device port, at least one light source carried by the portable housing and positioned to illuminate the at least one plug-in device port, an optical sensor carried by the portable housing configured to determine an ambient light level, and a second NFC sensor carried by the portable housing and configured to establish NFC communications with the first NFC sensor when in proximity therewith. The mobile wireless communications device may further include a controller carried by the portable housing and coupled to the at least one light source, the optical sensor, and the second NFC sensor and configured to cause the at least one light source to illuminate the at least one plug-in device port based upon NFC communications between the first and second NFC sensors and the ambient light level. As such, the at least one plug-in device port may advantageously be illuminated to permit more controlled and systematic plugging in of the at least one plug-in device as appropriate based upon the ambient light level.

More particularly, the controller may be configured to cause the at least one light source to illuminate the at least one plug-in device port based upon NFC communications between the first and second NFC sensors and the ambient light level being below a threshold light level. Further, the controller may be configured to cause the at least one light source to illuminate the at least one plug-in device port with different luminosities based upon NFC communications between the first and second NFC sensors and the ambient light level. In addition, the controller may be further configured to cause the at least one light source to change illumination of the at least one plug-in device port based upon connection of the at least one plug-in device to the at least one plug-in device port.

The mobile wireless communications device may further comprise a display carried by the portable housing and coupled to the controller. As such, the controller may be configured to cause the display to display a location indicator for the at least one plug-in device port when the at least one light source illuminates the at least one plug-in device port. Also, the controller may be further configured to determine if the at least one plug-in device and the at least one plug-in device port are incompatible and, if so, cause the display to display an incompatibility indicator.

The at least one plug-in device may comprise a plurality of different plug-in devices in some embodiments, and the at least one plug-in device port may comprise a plurality of different plug-in device ports. As such, the controller may be configured to cause the at least one light source to illuminate a given one of the plug-in device ports based upon NFC communications between the second NFC sensor and a first NFC sensor of a respective plug-in device type. By way of example, the at least one light source may comprise at least one light emitting diode (LED). Furthermore, the at least one plug-in device may comprise at least one universal serial bus (USB) cable, and the at least one plug-in device port may comprise at least one USB port. In addition, the mobile wireless communications device may also include a wireless transceiver coupled to the controller and configured for communicating over a wireless communications network.

A related mobile wireless communications device, such as the one described briefly above, is also provided. Moreover, an electronic device is also provided and is for use with at least one plug-in device comprising a first NFC sensor. The electronic device may include a housing defining at least one plug-in device port, at least one light source carried by the housing and positioned to illuminate the at least one plug-in device port, an optical sensor carried by the housing configured to determine an ambient light level, and a second NFC sensor carried by the housing and configured to establish NFC communications with the first NFC sensor when in proximity therewith. The electronic device may further include a controller carried by the housing and coupled to the at least one light source, the optical sensor, and the second NFC sensor and configured to cause the at least one light source to illuminate the at least one plug-in device port based upon NFC communications between the first and second NFC sensors and the ambient light level.

A related method is for using at least one plug-in device and a mobile wireless communications device, such as those described briefly above. The method may include establishing NFC communications between the first and second NFC sensors when in proximity with one another, determining an ambient light level using the optical sensor, and illuminating the at least one plug-in device port based upon NFC communications between the first and second NFC sensors and the ambient light level.

Figure 5:
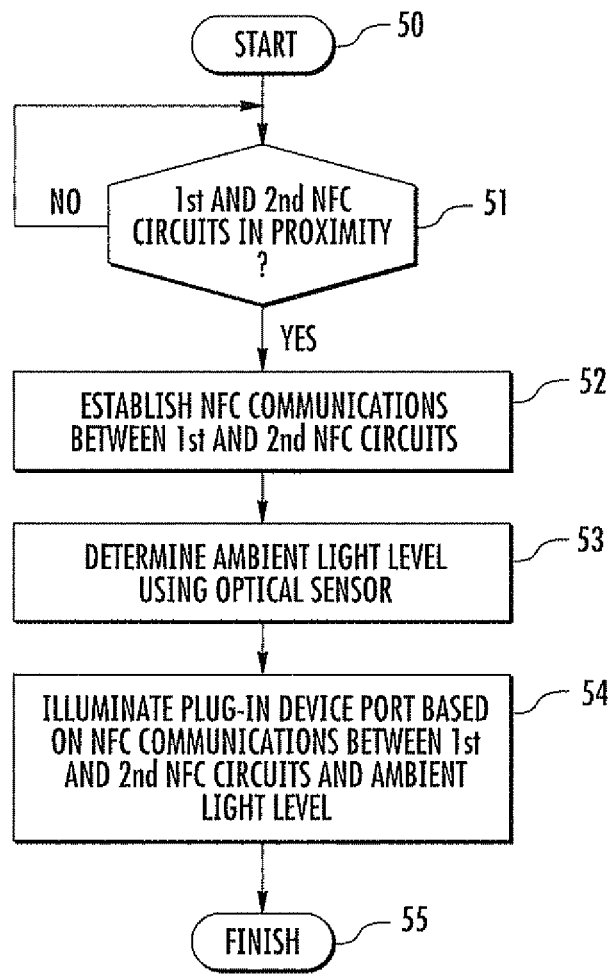
FIGS. 5 through 7 are flow diagrams illustrating method aspects associated with the systems of FIGS. 1 through 4.

Referring initially to FIGS. 1 and 5, a near-field communication (NFC) system 30 illustratively includes a plug-in device 31 comprising a first NFC sensor or circuit 32, and a mobile wireless communications device 33 (also referred to as a "mobile device" herein) which includes a second NFC sensor or circuit 35. Various types of plug-in devices may be used, such as cables, memory devices, portable flash drives, portable media players, projectors, headphones, external keypads, etc., which are otherwise adapted to be connected to respective plug-in ports on mobile devices or other electronic devices.

NFC is a short range variant of radio-frequency identification (RFID), typically operating at approximately 13.56 MHz. NFC technology allows a wireless connection to be established between a mobile device that has an embedded NFC chipset and an ISO 14443 reader terminal at a range of up to about 20 cm, so that the devices are "swiped" or otherwise moved in close proximity to communicate. NFC is a standardized technology that may be used in various applications such as mobile banking, ticketing, secure physical access, etc. The mobile device 33 may further include additional wireless capabilities beyond NFC in some embodiments, as will be discussed further below, but this is not required in all embodiments. Example mobile devices may include portable or personal media players (e.g., MP3 players, video players, etc.), remote controls (e.g., television or stereo remotes, etc.), portable gaming devices, portable or mobile telephones, smartphones, etc.

The mobile device 33 illustratively includes a portable housing 34 which defines a plug-in device port 36. By way of example, the plug-in device port may be a universal serial bus (USB) or micro-USB port, a headphone port, etc. The second NFC sensor 35 is carried by the portable housing 34. Beginning at Block 50, the second NFC sensor 35 is configured to establish NFC communications with the first NFC sensor 32 when in proximity therewith, at Blocks 51-52, as discussed above. The first and second NFC sensors 32, 35 may operate in a passive or active NFC mode in different embodiments. A light source 37, such as a light emitting diode(s), is also illustratively carried by the portable housing 34 and is positioned to illuminate the plug-in device port 36, as will be discussed further below. Moreover, an optical sensor 38 is further carried by the portable housing 33 and is configured to determine an ambient light level, i.e., the level of light in the environment surrounding the mobile device 33, at Block 53.

The mobile device 33 further illustratively includes a controller 39 carried by the portable housing 34 and coupled to the light source 37, the optical sensor 38, and the second NFC sensor 35. The controller 39 may cause the optical sensor 38 to perform an ambient light level determination or measurement responsive to the first and second NFC sensors 32, 35 engaging in NFC communications, for example. This may advantageously help promote power savings, as ambient light level measurements are only taken when needed. However, in some embodiments ambient light level measurements may be taken on an intermittent or periodic basis, for example. The ambient light level measurements may also be used for controlling other functions, such as setting a luminosity level of a display, etc., to provide appropriate display lighting for the environment in which the mobile device 33 is located.

The controller 39 is configured to cause the light source 37 to illuminate the plug-in device port 36 based upon NFC communications between the first and second NFC sensors 32, 35 and the ambient light level, at Block 54, thus concluding the method illustrated in FIG. 5 (Block 55), although in an implementation these steps may be repeated for subsequent device plug-in operations. This may be particularly advantageous in that it can be difficult to locate a port (e.g., USB, headset, etc.) on a mobile device in a relatively dark environment and insert or plug-in a plug-in device into the port in a controllable or systematic manner, since the light of the mobile device display typically is not directed so that it will adequately illuminate the side, top, back, or bottom of the device where such ports are often located.

Figure 6:
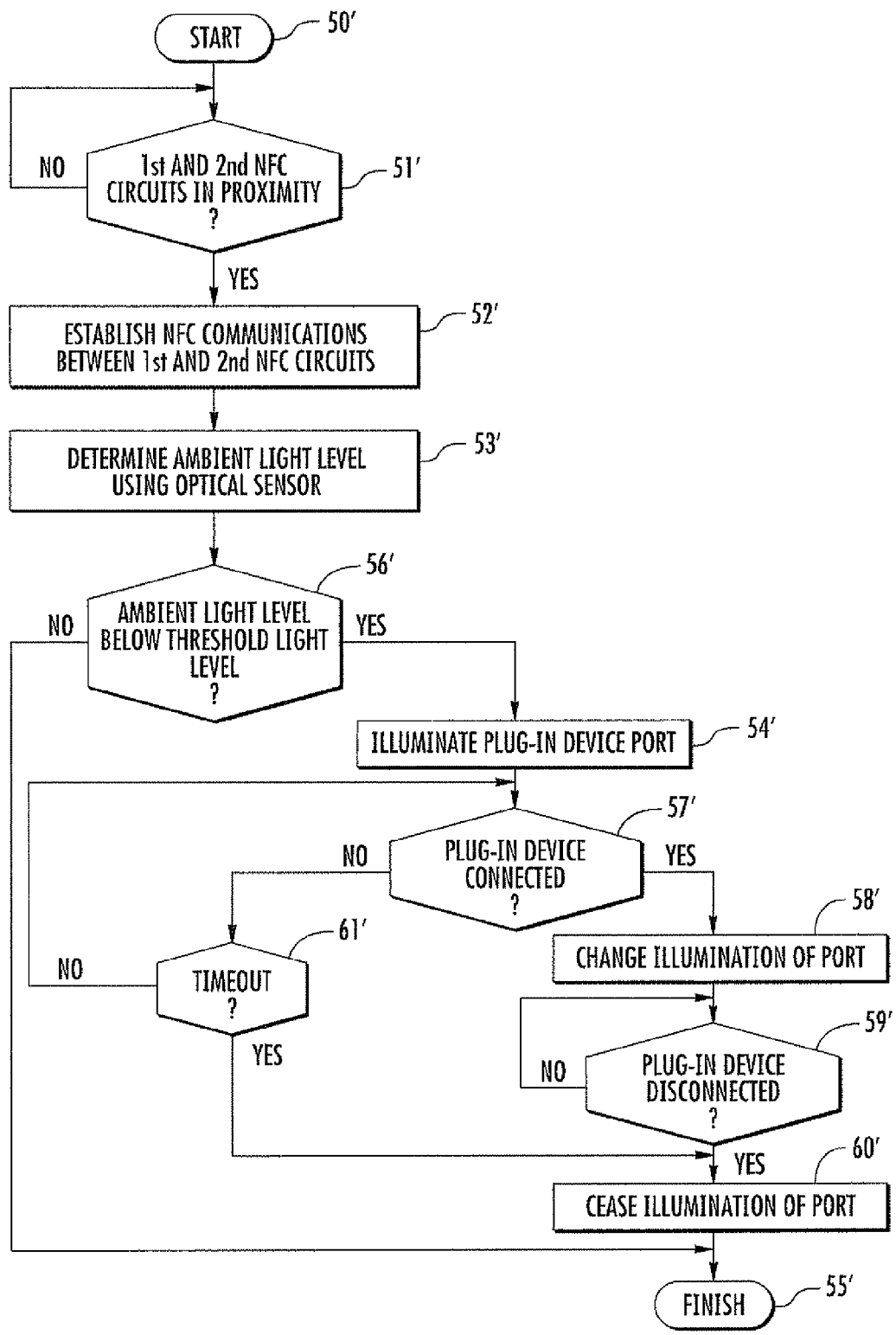

Referring additionally to FIG. 6, by way of example the controller 39 may selectively cause the light source 37 to illuminate the plug-in device port 36 when the ambient light level is below a threshold light level, at Blocks 56' and 54'. Thus, if the mobile device 33 is located in a well lit environment so that the measured ambient light level is above a given threshold light level (e.g., a well lit room, outside in direct sunlight, etc.), then it would otherwise be easy to see the plug-in device port 36, and illumination by the light source 37 need not be provided. However, if the mobile device 33 is located in a poorly lit environment so that the measured ambient light level is below the given threshold light level (e.g., in a dark room, outside at night, etc.), then the controller 39 will advantageously cause the light source 37 to illuminate the plug-in device port 36 to assist with connection of the plug-in device 31. The threshold light level may be established in various ways. For example, this setting may be fixed during the manufacturing process. It may also be a changeable setting, such that the threshold level may be changed through an on-screen menu generated by the controller 39, for example.

Another advantageous feature is that the controller 39 may change the illumination of the plug-in device port 36 once the plug-in device 31 is connected thereto, at Blocks 57'-58'. By way of example, the illumination level or luminosity of the plug-in device port 36 may be changed, such as by making it less bright or changing a color of the light. Thus, for example, the change in light level or color may therefore provide a visual indication that the plug-in device 31 is properly connected, charging, transferring data, etc. Upon disconnection of the plug-in device 31, at Block 59', the controller 39 may then cause the illumination source 37 to cease illuminating the plug-in port 36, at Block 60'. If the plug-in device 31 is not plugged in to the plug-in device port 36 within a timeout period (i.e., a set period of time) after NFC communication between the first and second NFC sensors 32, 35 is established, at Block 61', then the controller 39 may also cause the light source 37 to cease illuminating the plug in device port as well (Block 60').

Figure 7:
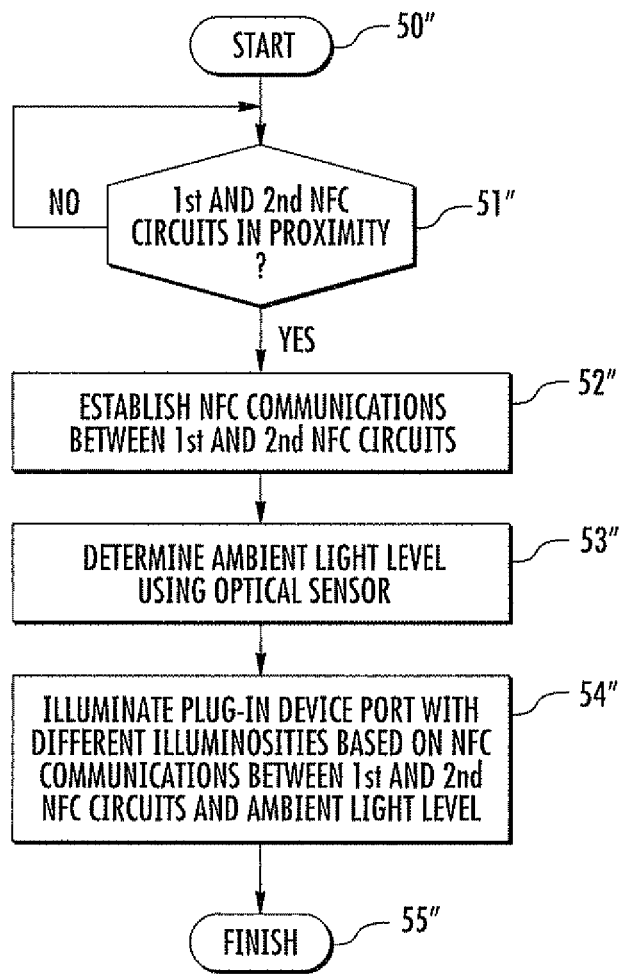

Referring additionally to FIG. 7, another approach for illuminating the plug-in device port 36 is that the controller 39 may cause the light source 37 to illuminate the plug-in device port with different luminosities, at Block 55". That is, rather than using a threshold light level to determine whether to illuminate the plug-in device port 36 as discussed above with reference to FIG. 6, the controller 39 may cause the light source 37 to use brighter luminosities in darker environments and lighter luminosities in brighter environments, or vice-versa depending upon whether brighter luminosities are useful for seeing the port in a well lit environment thereby permitting more controlled or systematic insertion of the plug-in device into the plug-in device port, for example. Stated alternatively, the controller 39 may cause the light source 37 to illuminate the plug-in device port 36 to an appropriate level based upon the given ambient light level.

Figure 2:
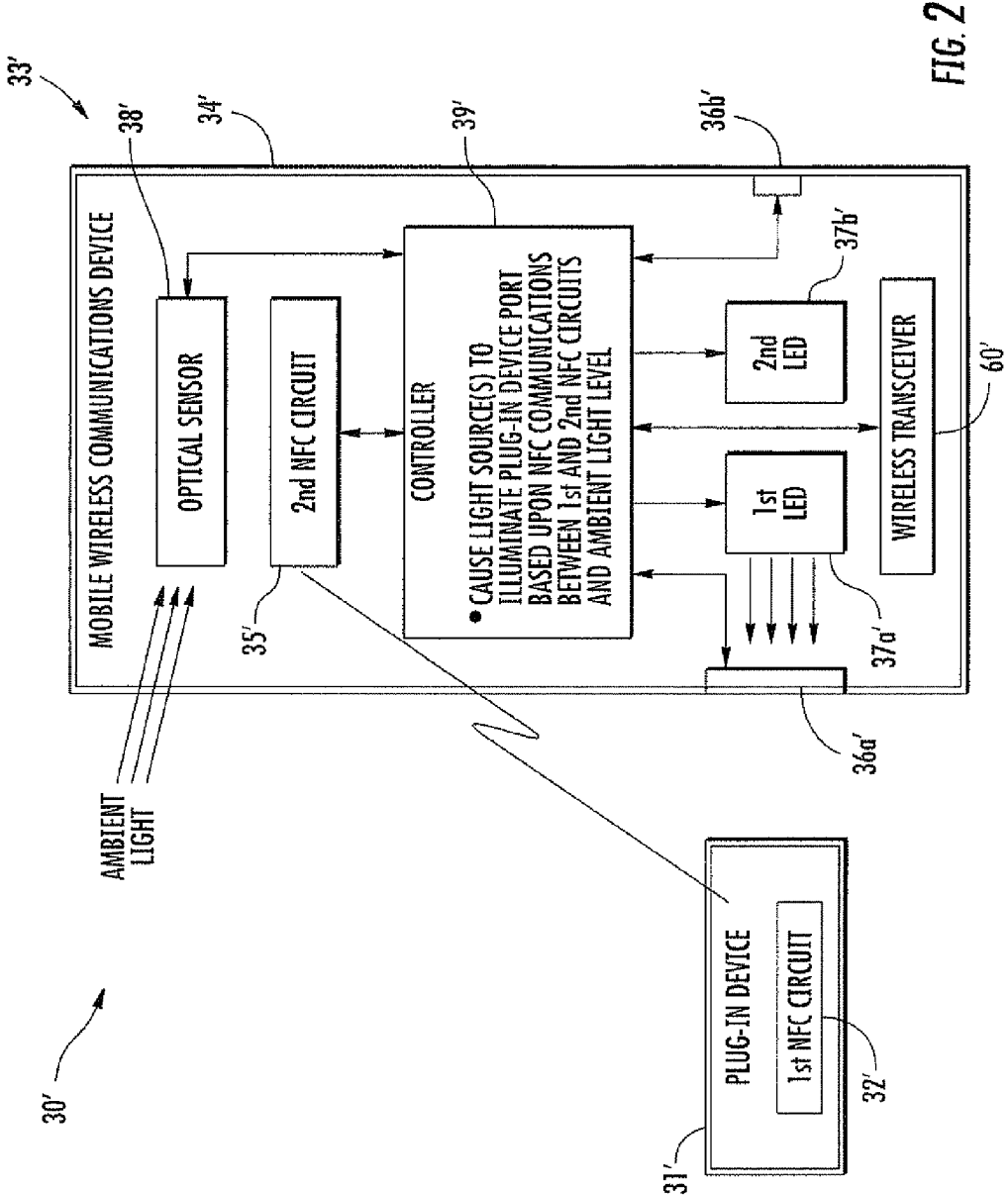
FIG. 2 is a schematic block diagram of an alternative embodiment of the NFC system of FIG. 1.

Turning now to FIG. 2, in this example the mobile device 33' illustratively includes a plurality of LED light sources 37a', 37b' each for illuminating a respective plug-in device port 36a', 36b'. In such embodiments, the controller 39' causes the appropriate light source 37a', 37b' to illuminate a given one of the plug-in device ports 36a', 36b' based upon NFC communications between the second NFC sensor 35' and the first NFC sensor 32' of a respective plug-in device type. Here, the plug-in device 31' corresponds to the plug-in device port 36a' (i.e., they are of a same type), so the controller 39' causes the plug-in device port 36a' to be illuminated but not the plug-in device port 36b', which is of a different type. For example, the plug-in device port 36a' may be a USB port, while the plug-in device port 36b' may be a micro-SD port, and the plug-in device 31' may have a USB plug compatible with the USE-based plug-in device port 36a', so in this example only plug-in device port 36a' may be illuminated. In the illustrated example, the mobile device 33' further includes a wireless transceiver 60' (e.g., cellular, WiFi, WiMAX, etc.) for communicating over a respective type of wireless network, as will be discussed further below.

Figure 3:
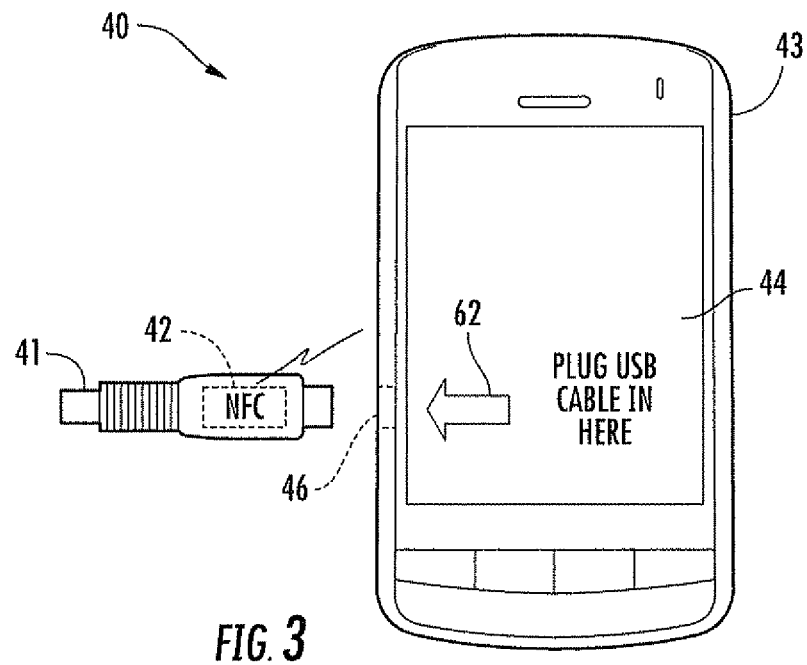
FIG. 3 is a front view of an example implementation of the system of FIG. 1 in which the illustrated mobile wireless communications device provides a location indicator for a plug-in cable.

Turning now to FIG. 3, an example implementation of an NFC system 40 includes a USB cable 41 with an embedded NFC sensor 42, and a mobile device 43 including a display 44 and a USB port 46. For ease of illustration, the optical sensor, light source, second NFC sensor, and controller components of the mobile device 43, which are similar to those described above with reference to FIGS. 1 and 2, are not shown in FIG. 3. The controller of the mobile device 43 may advantageously be configured to cause the display 44 to display a location indicator to indicate the location of the plug-in device port 46 when the first and second NFC sensors come in proximity and begin communicating. In the present example, the location indicator takes the form of an arrow 62 on the display 44, the arrow 62 points to the location of the USB port 46, as shown, as well as a message that reads "Plug USB Cable In Here". The message, and direction of the arrow 62, may be changed for different types of plug-in devices. For example, if a headphone plug with an embedded NFC sensor is brought in close proximity to the mobile device 43, then the arrow may point to the upper right corner of the display 44 (or other location of the headphone port), and the message may change to read "Plug Headphones In Here". Other location indicators and messages may also be used in different embodiments.

Figure 4:
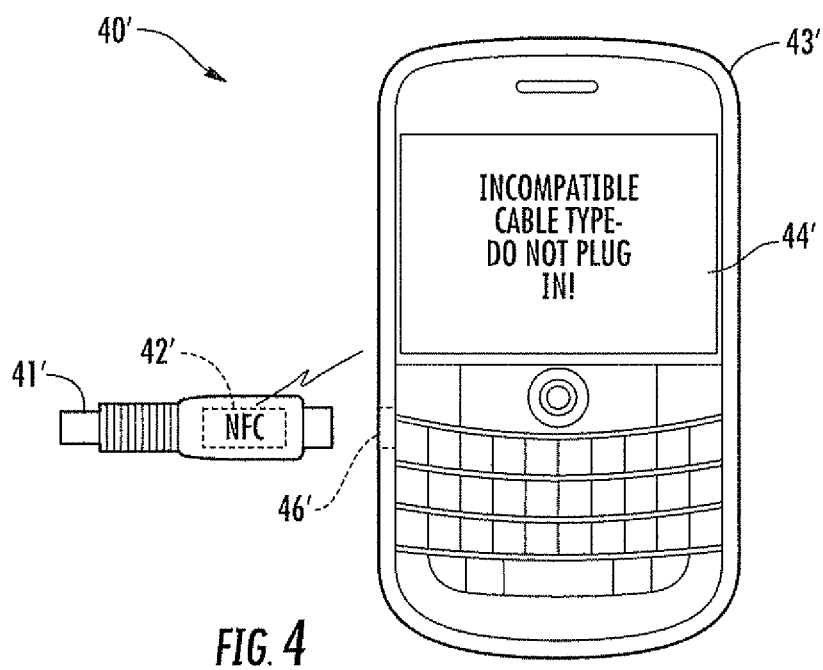
FIG. 4 is a front view of an alternative example implementation of the system of FIG. 1 in which the illustrated mobile wireless communications device provides an incompatibility indicator for a plug-in cable.

Referring to FIG. 4, there is shown a similar system 40' with a different style of mobile device 43', which has a different type of USB connector port 46' that is not compatible with the NFC cable 41'. Thus, as NFC communications are established with the first NFC sensor 42', the controller of the device 43' determines that the USB cable 41' and the USB port 46' are incompatible, e.g., based upon an identification (ID) or other identifying data provided by the first NFC sensor 42'. The controller accordingly causes the display 44' to display an incompatibility indicator. In the present example, the incompatibility indicator takes the form of a message that reads "INCOMPATIBLE CABLE TYPE—DO NOT PLUG IN!" Here again, other incompatibility indicators or messages may also be used in different embodiments.

It should be noted that while the location and incompatibility indicators are shown separately in FIGS. 3 and 4 for clarity of illustration, both features may be implemented in a same mobile device in some embodiments. Moreover, in some embodiments the location and incompatibility indicators may be used without light sources 37, 37'. That is, in some embodiments separate light sources 37, 37' need not be included, and the display 44 or 44' may be used to provide location or incompatibility indicators without illumination of the device port 46, 46'.

It should also be noted that the above-described plug-in device port illumination techniques may be used with other types of electronic devices and computing devices besides mobile devices. For example, these techniques may also be used with electronic devices which have housings that are not necessarily considered to be portable, such as television equipment, stereo equipment, video game consoles, computers, etc.

Example components of a mobile wireless communications device 1000 that may be used in accordance with the above-described embodiments are further described below with reference to FIG. 8. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
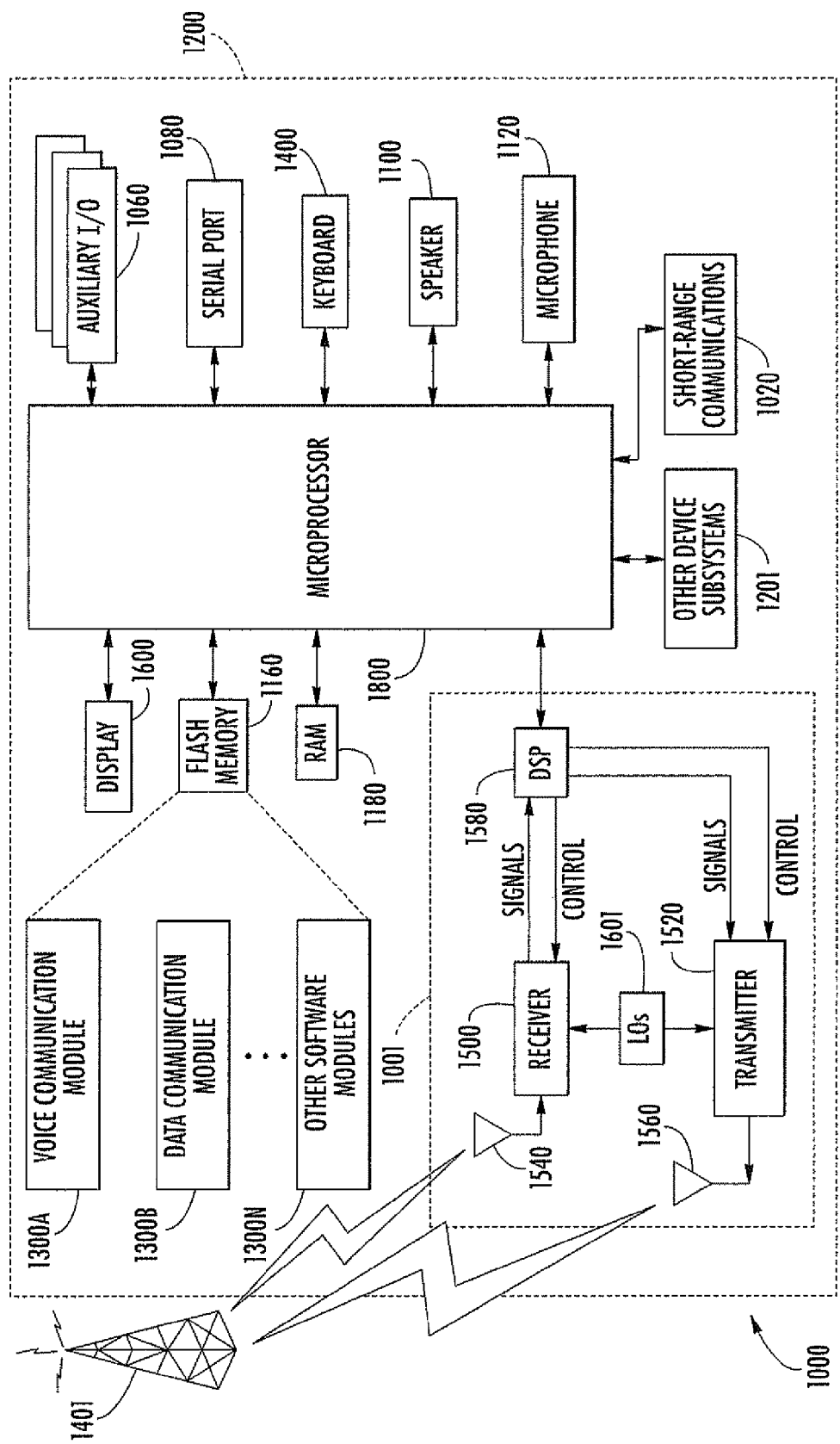
FIG. 8 is a schematic block diagram illustrating example components of a mobile wireless communications device that may be used with the NFC systems of FIGS. 1 through 4.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A near-field communication (NFC) system comprising:
a plug-in device comprising a first NFC sensor; and
a mobile wireless communications device comprising
a housing defining a plug-in device port,
a light source carried by said housing, the light source being positioned to illuminate the plug-in device port,
an optical sensor carried by said portable housing, the optical sensor being configured to determine an ambient light level,
a second NFC sensor carried by said portable housing, the second NFC sensor being configured to establish NFC communications with said first NEC sensor when in proximity therewith, and
a controller carried by said portable housing and coupled to said light source, said optical sensor, and said second NFC sensor, the controller being configured to cause said light source to illuminate the plug-in device port with different luminosities based upon a determination that the first NFC sensor and the second NFC sensor are proximate determined by NFC communications between said first and second NFC sensors and the ambient light level determined by the optical sensor.

2. The NFC system of claim 1 wherein said controller is configured to cause said light source to illuminate the plug-in device port based upon NFC communications between said first and second NFC sensors and the ambient light level being below a threshold light level.

3. The NFC system of claim 1 wherein said controller is further configured to cause said light source to change illumination of the plug-in device port based upon physical connection of the plug-in device with the plug-in device port.

4. The NFC system of claim 1 wherein said mobile wireless communications device further comprises a display carried by said portable housing and coupled to said controller; and wherein said controller is configured to cause said display to display a location indicator to indicate a location of the plug-in device port.

5. The NFC system of claim 1 wherein said mobile wireless communications device further comprises a display carried by said portable housing and coupled to said controller; and wherein said controller is further configured to determine whether the plug-in device and the plug-in device port are incompatible and, if so, cause said display to display an incompatibility indicator.

6. The NFC system of claim 1 wherein the plug-in device comprises a plurality of different plug-in devices; wherein the plug-in device port comprises a plurality of different plug-in device ports; and wherein said controller is configured to cause said light source to illuminate a given one of the plug-in device ports based upon NFC communications between said second NFC sensor and the first NFC sensor of a respective plug-in device type.

7. The NFC system of claim 1 wherein said light source comprises a light emitting diode (LED).

8. The NFC system of claim 1 wherein said plug-in device comprises a universal serial bus (USB) cable, and wherein the plug-in device port comprises a USB port.

9. The NFC system of claim 1 further comprising a wireless transceiver coupled to said controller and configured for communicating over a wireless communications network.

10. A mobile wireless communications device capable of being used with a plug-in device comprising a first near-field communication (NFC) sensor, the mobile wireless communications device comprising:
a housing defining a plug-in device port;
a light source carried by said housing, the light source being positioned to illuminate the plug-in device port;
an optical sensor carried by said portable housing, the optical sensor being configured to determine an ambient light level;
a second NFC sensor carried by said portable housing, the second NFC sensor being configured to establish NFC communications with said first NFC sensor when in proximity therewith; and
a controller carried by said housing and coupled to said light source, said optical sensor, and said second NFC sensor, the controller being configured to cause said light source to illuminate the plug-in device port with different luminosities based upon a determination that the first NFC sensor and the second NFC sensor are proximate determined by NFC communications between said first and second NFC sensors and the ambient light level determined by the optical sensor.

11. The mobile wireless communications device of claim 10 wherein said controller is configured to cause said light source to illuminate the plug-in device port based upon NFC communications between said first and second NFC sensors and the ambient light level being below a threshold light level.

12. The mobile wireless communications device of claim 10 wherein said controller is further configured to cause said light source to change illumination of the plug-in device port based upon physical connection of the plug-in device with the plug-in device port.

13. The mobile wireless communications device of claim 10 wherein said mobile wireless communications device further comprises a display carried by said portable housing and coupled to said controller; and wherein said controller is configured to cause said display to display a location indicator to indicate a location of the plug-in device port.

14. An electronic device capable of being used with a plug-in device comprising a first near-field communication (NFC) sensor, the electronic device comprising:
a housing defining a plug-in device port;
a light source carried by said housing, the light source being positioned to illuminate the plug-in device port;
an optical sensor carried by said housing, the optical sensor being configured to determine an ambient light level;
a second NFC sensor carried by said housing, the second NFC sensor being configured to establish NFC communications with said first NFC sensor when in proximity therewith; and
a controller carried by said housing and coupled to said light source, said optical sensor, and said second NFC sensor, the controller being configured to cause said light source to illuminate the plug-in device port with different luminosities based upon a determination that the first NFC sensor and the second NFC sensor are proximate determined by NFC communications between said first and second NFC sensors and the ambient light level determined by the optical sensor.

15. The electronic device of claim 14 wherein said controller is configured to cause said light source to illuminate the plug-in device port based upon NFC communications between said first and second NFC sensors and the ambient light level being below a threshold light level.

16. The electronic device of claim 14 wherein said controller is further configured to cause said light source to change illumination of the plug-in device port based upon physical connection of the plug-in device to the plug-in device port.

17. The electronic device of claim 14 wherein said mobile wireless communications device further comprises a display carried by said portable housing and coupled to said controller; and wherein said controller is configured to cause said display to display a location indicator to indicate a location of the plug-in device port.

18. A method of using a mobile wireless communications device comprising a housing defining a plug-in device port, a light source carried by the portable housing, the light source being positioned to illuminate the plug-in device port, an optical sensor carried by the portable housing, and a second NFC sensor carried by the portable housing, the method comprising:
establishing NFC communications between a first NFC sensor of a plug-in device and the second NFC sensor when in proximity with one another;
determining an ambient light level using the optical sensor; and
illuminating the plug-in device port with different luminosities based upon a determination that the first NFC sensor and the second NFC sensor are proximate determined by NFC communications between the first and second NFC sensors and the ambient light level determined by the optical sensor.

19. The method of claim 18 wherein said illuminating comprises illuminating the plug-in device port based upon NFC communications between the first and second NFC sensors and the ambient light level being below a threshold light level.

20. The method of claim 18 further comprising changing illumination of the plug-in device port based upon physical connection of the plug-in device with the plug-in device port.

21. The method of claim 18, wherein the mobile wireless communications device further comprises a display carried by the portable housing and coupled to the controller, the method further comprising displaying a location indicator on the display to indicate a location of the plug-in device port.

* * * * *